3,256,250
SULFONATED ION EXCHANGE RESIN HAVING AN ELECTRONEGATIVE NO₂ SUBSTITUENT
Vincent J. Frilette, Erlton, N.J., assignor to Socony Mobil Oil Company, Inc., a corporation of New York
No Drawing. Filed Sept. 26, 1961, Ser. No. 140,656
2 Claims. (Cl. 260—79.3)

This invention relates to improved resin catalysts. It is more particularly concerned with sulfonated organic resin catalysts having improved activity for hydration and dehydration reactions, and having improved stability.

As is well known to those familiar with the art, sulfonated organic resins, such as sulfonated copolymers of styrene and divinylbenzene, have been proposed as catalysts for the hydration of olefins to alcohols and ethers. The use of such catalysts has advantages over the use of the usual sulfuric acid-catalyzed processes. The use of continuous fixed-bed operation is made possible and acid corrosion, which requires expensive alloys in sulfuric acid process equipment, is minimized.

The successful commercial use of the solid resinous catalysts is very strongly dependent upon useful catalyst life. In the case of less refractory tertiary olefins, such as isobutylene, the temperature required for hydration is sufficiently low that the catalyst is usually deactivated relatively slowly. On the other hand, hydration of more refractory olefins, such as propylene and ethylene, requires temperatures of 250–350° F. At these temperatures, the sulfonic acid group on the sulfonated resin catalyst undergoes hydrolysis at an appreciable rate, forming inactive resin and free sulfuric acid. This hydrolytic instability of these resin catalysts makes the use of them at elevated temperatures intrinsically costly.

It has now been found that sulfonated organic resin catalysts can be produced that are less susceptible to hydrolysis during high temperature hydration processes and which have enhanced catalytic activity. It has been discovered that such improved sulfonated organic resin catalysts are obtained when the aryl nuclei thereof contain certain electronegative substituents.

Accordingly, it is a broad object of this invention to provide a novel catalyst for hydration reactions. Another object is to provide sulfonated resin catalysts that have enhanced stability and activity for high temperature hydration reactions. A specific object is to provide sulfonated organic resin catalysts containing electronegative substituents. Another specific object is to provide an improved process for the catalytic hydration of propylene. A further specific object is to provide cation-exchange resins of improved heat stability. Other objects and advantages of this invention will become apparent to those skilled in the art from the following detailed description.

In general, this invention provides a hydrogen form, cross-linked sulfonated organic resin catalyst having at least one electronegative substituent selected from the group consisting or $-NO_2$, $-C\equiv N$, and halogen.

The organic resins used in making the catalysts of this invention are polymers of vinylaromatic monomers cross-linked with divinyl monomers. The vinylaromatic monomers can be hydrocarbon or heterocyclic, such as styrene, alpha methylstyrene, m-methylstyrene, p-methylstyrene, p-ethylstyrene, vinylnaphthalene, acenaphthylene, and vinylthiophene. In one embodiment, of this invention, as is discussed hereinafter, the vinylaromatic monomer can be a hydrocarbon or heterocyclic compound having one or more nitro ($-NO_2$), halogen (Cl—, Br—, F—), or cyano ($-C\equiv N$) substituent on the nucleus. Non-limiting examples of such substituted vinylaromatic monomers are o-nitrostyrene, p-nitrostyrene, p-chlorostyrene, o-chlorostyrene, mixed dichlorostyrenes, and mononitro vinylthiophene.

The divinylmonomers are, broadly, any polyolefin capable of functioning as cross-linking agents. Non-limiting examples are divinylbenzene, diallylphthalate, triallyl cyanurate, butadiene, and ethyleneglycol dimethacrylate. The preferred cross-linking agent is divinylbenzene. The amount of cross-linking agent in the resin polymer can be between about 2 percent and about 25 percent by weight and, preferably, between about 5 percent and about 20 percent by weight.

As will be appreciated by those skilled in the art, the catalysts of this invention can be produced in several manners, in order to achieve hydrogen form sulfonated cross-linked ion exchange resins having one or more electronegative substituents, i.e., cyano, nitro, or halo, Thus, the resin can be prepared from a substituted vinylaromatic monomer, as described hereinbefore, and a cross-linking agent. This resin, when sulfonated, gives directly the desired catalysts of this invention. For example, o-chlorostyrene can be copolymerized with divinylbenzene, and the insoluble cross-linked polymer can be sulfonated to yield the stable resin.

Another way to produce the catalysts of this invention is to prepare the sulfonated resin in the usual way and then to introduce the electronegative substituent into the nucleus. When making the catalyst in this manner, use can be made of the commericially available sulfonated resin ion exchange catalysts. For example, a styrenedivinylbenzene copolymer resin can be sulfonated and then nitrated.

Although all the electronegative substituents are effective, the nitro group may be introduced with particular ease by nitration of sulfonated copolymers of styrene and divinylbenzene at the termination of the sulfonation. The preferred procedure for this reaction is as follows: the sulfonating medium is decanted and fresh 95–97% sulfuric acid is added in sufficient quantity to slurry the sulfonated polymer; to this slurry is added concentrated (70%) nitric acid in a quantity sufficient to produce the desired nitration level. Nitrogen levels of from 3–8% are readily produced by this method without extensive deterioration of the polymer structure. The nitrated product is then washed free of mineral acid.

Chlorine can be introduced into sulfonated, cross-linked polystyrene structures or its salts by suspending acid-free polymer in water and bubbling chlorine through the suspension at moderately elevated temperatures, care being exercised to exclude light from the reaction mixture so as to direct the reaction of the chlorine into the aromatic ring. One chlorine atom per aromatic ring can be introduced easily by this method.

The polymerization may be carried out in a number of different ways. These include bulk polymerization, suspension polymerization, or emulsion polymerization. Suspension polymerization is preferred, since the regular particulate nature of the polymer so formed is readily treated to produce chemical transformations and the final products are readily adapted to use as ion exchangers or catalysts. Desirable porous structures may be formed which are particularly suited for catalytic applications by the method of polymerization in the presence of solvents which is described in copending application Serial No. 127,841 filed July 31, 1961. Such structures also may be formed from popcorn polymers.

The introduction of sulfonic acid groups into the polymers can be achieved in any desired manner. The art of sulfonating styrene polymers, including the use of a removable swelling agent, such as propylene dichloride, is well known. The technique used, however, should be selected to result in a neutralization capacity (ion exchange capacity) of at least 0.5 meq. of KOH per gram of hydrogen form of dried solid catalyst.

A typical sulfonation method is to contact the resin with gaseous sulfur trioxide or with sulfur trioxide dissolved in a solvent, such as chloroform. Other conventional sulfonating agents, such as chlorosulfonic acid or concentrated sulfuric acid, can be used. The temperature and reaction time depend upon the degree of cross-linking of the polymer, upon the selected sulfonating agent, and upon the degree of sulfonation that is desired. The best sulfonation conditions can be readily ascertained by making a few trial reactions and determining the degree of sulfonation by titrating the washed product with sodium hydroxide solution.

The catalysts of this invention are useful as ion-exchange resins, particularly for special applications at elevated temperatures. They can also be used as catalysts for hydrating olefins to alcohols and for dehydrating alcohols to olefins.

The following examples illustrate the sulfonated resin catalysts of this invention and demonstrates their catalytic activity. As those skilled in the art will readily appreciate, materials and manipulations other than those used in the examples can be used, as is described hereinbefore.

*Example 1*

A 260 gram portion of a water-swollen (20–50 mesh) bead copolymer styrene and divinyl benzene sulfonated to a capacity of 5 milliequivalents per gram was rinsed with a large excess of concentrated sulfuric acid. This starting resin was commercial (Dowex 50W–X–8) sulfonated styrene polymer resin, cross-linked with 8 weight percent divinylbenzene. It was converted to the hydrogen form with 15% $H_2SO_4$. The resultant slurry of bead resin in sulfuric acid was cooled to 2° C. Then, 80 ml. of concentrated nitric acid (70% $HNO_3$) were added slowly, the temperature of the slurry being held below 10° C. When addition of nitric acid was complete, the slurry was held at 10° C. for one hour. The acids were separated from the solid resin and the solid product was waterwashed to remove free acid and dried. The nitrated, sulfonated styrene-divinylbenzene resin catalyst contained 3.14 percent nitrogen and 11.6 weight percent sulfur and had an exchange capacity of 3.5 milliequivalents of KOH per gram of dry hydrogen form resin.

*Example 2*

A charge of 120 cc. (26.3 g. on dry basis) of the water-swollen resin catalyst prepared as described in Example 1 was placed in a vertical tube reactor. The reactor was heated by an external furnace and had a valve in the lower, outlet end that could be adjusted to discharge at a desired reactor pressure. Water, at a rate of 158 cc. per hour, and liquid propylene, at a rate of 31.2 cc. per hour, were pumped into the top of the reactor. The catalyst bed was heated to a temperature of about 250° F. The outlet valve was set to discharge product when the pressure in the reactor exceeded 500 p.s.i.g. After a lineout period (i.e., a time in which the reaction had settled to a steady and uniform product effluent), the liquid product was found to contain 3.61 weight percent isopropyl alcohol. This corresponds to production of 0.217 gram of isopropyl alcohol per hour per gram of catalyst.

In similar runs, using as the catalyst a hydrogen form commercial sulfonated styrene-divinylbenzene (8%) resin, even at 270° F. only 0.179 gram isopropyl alcohol per gram of catalyst per hour was produced.

*Example 3*

A 39.9 gram portion of commercial ion exchange resin [hydrogen form sulfonated copolymer of styrene and divinylbenzene (8 weight percent) having an exchange capacity of about 5 milliequivalents per gram] was swelled in water. The water-swollen resin was placed in an agitated reaction vessel containing a gas dispersion tube. To the reactor were added 150 ml. water and the reactor was shielded from light. The reactor contents were heated at 50° C. Over a period of six hours, 37.5 grams chlorine were passed through the agitated suspension of resin. The resin was separated by filtration and washed free of free acid. The product, ring-chlorinated, sulfonated styrene-divinylbenzene resin catalyst, had an orange color. It contained 21.7 weight percent chlorine and 10.3 weight percent sulfur. It had a capacity of 3.0 milliequivalents per gram.

*Example 4*

As described in Example 3, two samples of the commercial resin were chlorinated to different degrees. The temperature and time of chlorination for each sample is set forth in Table I.

The activity of the chlorinated resin catalyst was measured by its capacity to catalyze dehydration of tertiary butyl alcohol. To 100 ml. of a mixture of 95 weight percent tertiary butyl alcohol and 5 weight percent water, were added about 2 grams of catalyst. The mixture was heated to reflux. The rate of dehydration was evaluated by measuring the rate of isobutylene evolution.

For comprarison, a run was also made using a sample of the original, unchlorinated commercial sulfonated resin. Pertinent data for all runs are set forth in Table I.

TABLE I

| Example | Sulfonated Resin | Chlorination | | Capacity, meq./g.H+ | Wt. percent Cl | Rate of decomposition t-buanol, ml. isobutene/ min./meq. |
|---|---|---|---|---|---|---|
| | | Time, hrs. | Temp., °C. | | | |
| 4A | 8% DVB/Styrene | | | 4.7 | 0.0 | 2.3 |
| 4B | Chlorinated 4A | 7 | 80 | 2.8 | 24.1 | 2.9 |
| 4C | Chlorinated 4A | 7 | 50 | 3.0 | 18.7 | 3.0 |

Although the present invention has been described with preferred embodiments, it is to be understood that modifications and variations may be restored to, without depart-

What is claimed is:

1. A hydrogen-form, sulfonated divinyl cross-linked vinylaromatic resin catalyst having an electronegative $NO_2$ substituent in an amount varying between about 3 percent and about 8 percent nitrogen by weight.

2. As a catalyst, a hydrogen-form, sulfonated cross-linked copolymer of styrene with between about 5 percent and about 20 percent, by weight, of divinylbenzene and having an electronegative —$NO_2$ substituent in an amount varying between about 3 percent and about 8 percent nitrogen by weight.

References Cited by the Examiner

UNITED STATES PATENTS

| | | | |
|---|---|---|---|
| 2,592,350 | 4/1952 | Skogseid | 260—24 |
| 2,628,193 | 2/1953 | D'Alelio | 210—38 |
| 2,645,621 | 7/1953 | D'Alelio | 260—79.3 |
| 2,669,557 | 2/1954 | Wheaton | 260—79.3 |

OTHER REFERENCES

Kunin, Ion Exchange Resins, pages 255–259, 1958, John Wiley and Sons, Inc. (Scientific Library).

WILLIAM H. SHORT, *Primary Examiner.*

HAROLD N. BURSTEIN, *Examiner.*

J. C. MARTIN, *Assistant Examiner.*